United States Patent [19]
Takemura et al.

[11] Patent Number: 5,609,658
[45] Date of Patent: Mar. 11, 1997

[54] AIR CLEANER FOR A VEHICLE

[75] Inventors: Hiroo Takemura; Hajime Yamada, both of Saitama, Japan

[73] Assignee: Honda Giken Kogyo Kabushiki Kaisha, Tokyo, Japan

[21] Appl. No.: 476,320

[22] Filed: Jun. 7, 1995

[30] Foreign Application Priority Data

Jul. 13, 1994 [JP] Japan .................................. 6-161528

[51] Int. Cl.$^6$ .................................................. B01D 50/00
[52] U.S. Cl. ........................... 55/385.3; 55/418; 55/495; 55/DIG. 28; 123/198 E; 180/219
[58] Field of Search .................................. 180/218, 219; 123/198 E; 55/385.3, DIG. 28, 418, 495

[56] References Cited

U.S. PATENT DOCUMENTS

| | | | |
|---|---|---|---|
| 4,364,340 | 12/1982 | Kimura | 55/385.3 |
| 4,425,977 | 1/1984 | Michiuchi | 55/385.3 |
| 4,484,651 | 11/1984 | Hattori et al. | 55/385.3 |
| 4,509,613 | 4/1985 | Yamaguchi | 55/385.3 |
| 4,592,316 | 6/1986 | Shiratsuchi et al. | 55/385.3 |
| 4,648,474 | 3/1987 | Shinozaki et al. | 55/385.3 |
| 4,790,864 | 12/1988 | Kostun | 123/198 E |
| 4,815,554 | 3/1989 | Hara et al. | 123/198 E |
| 5,059,221 | 10/1991 | McWilliam | 123/198 E |
| 5,400,753 | 3/1995 | Andress et al. | 55/385.3 |

FOREIGN PATENT DOCUMENTS

| | | | |
|---|---|---|---|
| 0317093 | 5/1989 | European Pat. Off. | 180/219 |
| 55-156245 | 12/1980 | Japan | 55/385.3 |
| 64-53453 | 4/1989 | Japan . | |
| 2-45281 | 2/1990 | Japan | 180/219 |
| 2-128975 | 5/1990 | Japan | 180/219 |
| 2-216380 | 8/1990 | Japan | 180/219 |
| 2-197481 | 8/1990 | Japan | 180/219 |

*Primary Examiner*—Jay H. Woo
*Assistant Examiner*—Duane S. Smith

[57] ABSTRACT

An air intake duct is formed on an upper case of an air cleaner. The bottom surface of the air intake duct is also an upper surface of the upper case. An opening portion of the air intake duct is opened rearwardly of the vehicle, and a recessed portion is formed on the upper surface of the upper case at a portion in front of the opening portion of the air intake duct relative to the air flow direction in the air intake duct. As a result, the bottom surface of the opening portion is formed higher than the surface of the recessed portion. The bottom surface of the air intake duct is formed to be gradually upwardly inclined in the direction of the air flow in the air intake duct traveling from the opening portion of the air intake duct to an opening portion formed on the upper surface of the upper case.

16 Claims, 7 Drawing Sheets

AIR CLEANER FOR A VEHICLE

BACKGROUND OF THE INVENTION

1. Field of the Invention

The present invention relates to an air cleaner for a motorcycle, and particularly to an air cleaner having an improved air intake duct.

2. Description of the Background Art

In an air cleaner of a motorcycle, the outside air drawn in through an air intake duct is supplied to a carburetor through a filter provided in the air cleaner case. Conventionally, the air intake duct has been formed in a shape having a large curved portion, for example a trap shape, for preventing water droplets from entering the air cleaner case. Accordingly, the air intake duct has been fabricated separately from the air cleaner case. The disadvantages of this construction are that the number of individual parts is increased, and consequently, the assembly of these parts takes considerable time. Further, the necessary capacity of the air cleaner is difficult to ensure because of the need to maintain a space in which the air intake duct may be placed.

A technique using part of an air cleaner case as an air intake duct is disclosed in Japanese Utility Model Laid-open No. SHO 64-53453. In this technique, the upper wall of the air cleaner case serves as the bottom wall of the air intake duct, and the opening of the air intake duct is directed toward the rear of the motorcycle. The disadvantage of this technique is that it is easy for water droplets to enter the air cleaner case by moving along the bottom wall of the air intake duct.

SUMMARY AND OBJECTS OF THE INVENTION

To overcome the above-mentioned disadvantages, an air cleaner for a vehicle which is adapted to supply outside air drawn in through an air intake duct to a carburetor through a filter is disclosed. The bottom wall of the air intake duct is formed by the upper wall of an air cleaner case. Furthermore, a portion in front of an opening portion of the air intake duct is formed lower than the bottom surface of the opening portion.

Preferably, the opening portion of the air intake duct is opened rearwardly of the vehicle, and the bottom surface of the air intake duct is formed to be gradually upwardly inclined traveling in the direction from the opening portion to the front side of the vehicle.

The outside air is drawn in through an opening portion of the air intake duct which is opened toward the rear side of the vehicle and thereafter passes through an opening on the upper surface of an air cleaner case. The outside air is then supplied to a carburetor by way of a filter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
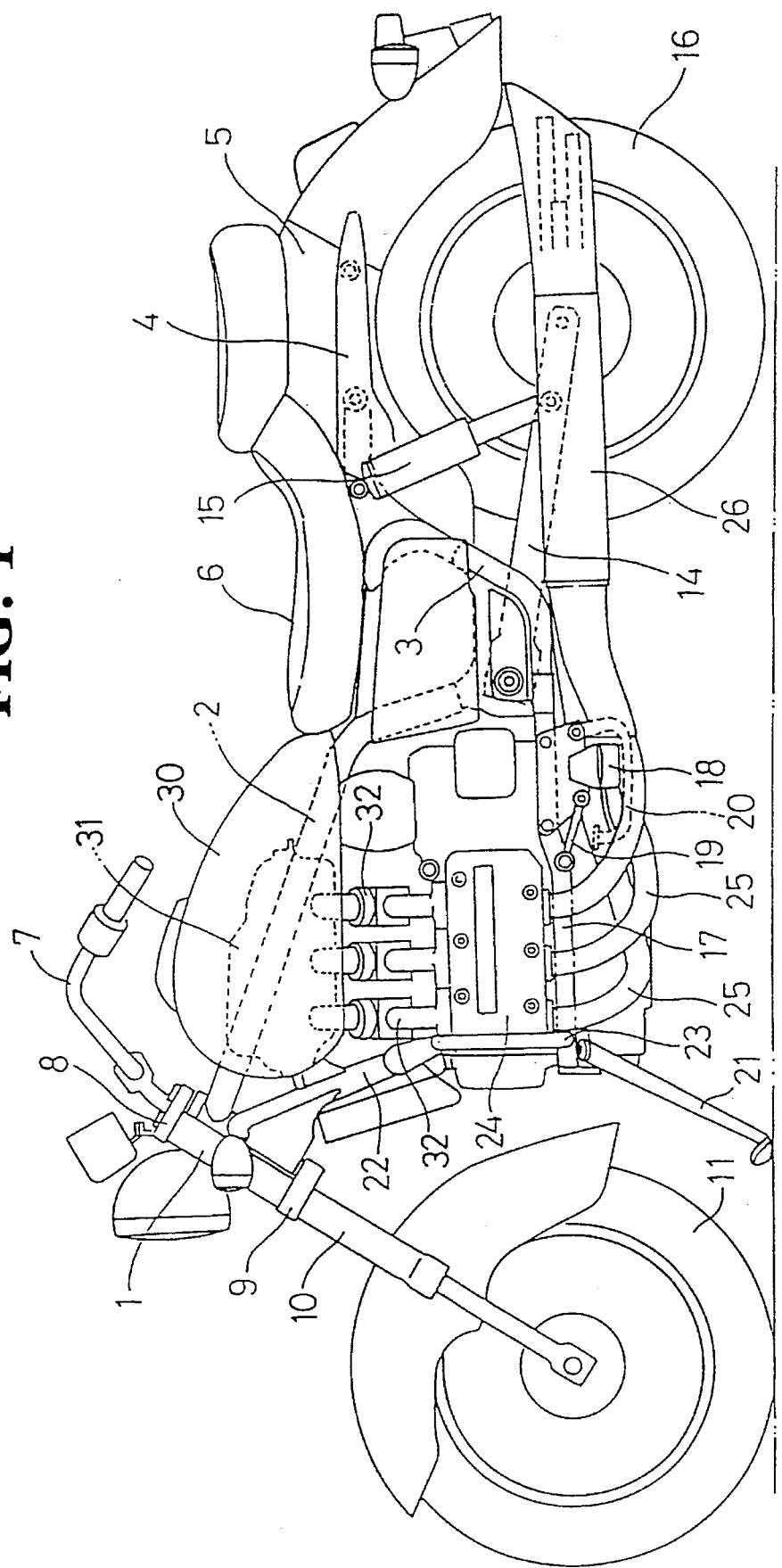
FIG. 1 is a side view showing the whole construction of a motorcycle to which an air cleaner of the present invention is applied.
Figure 2:
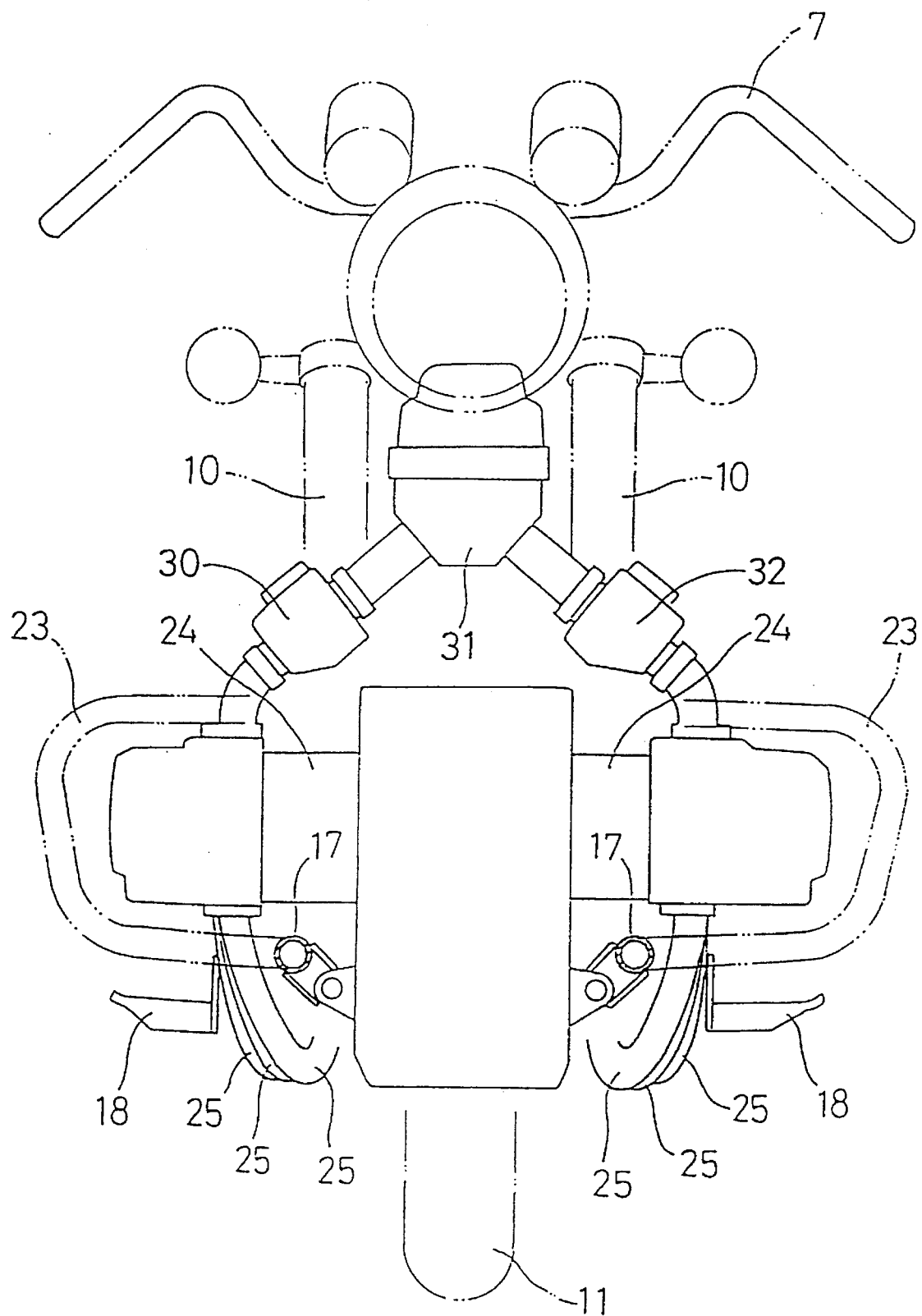
FIG. 2 is a front view of the motorcycle.
Figure 3:
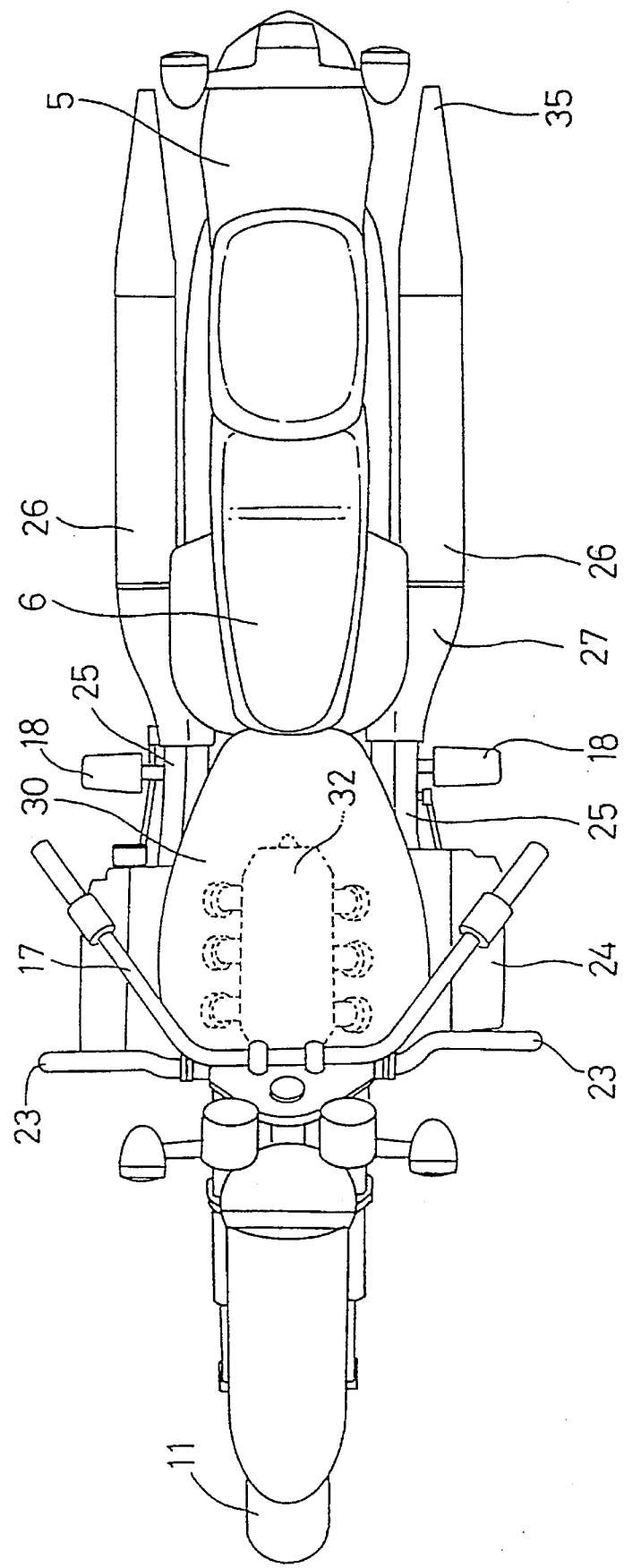
FIG. 3 is a plan view of the motorcycle.
Figure 4:
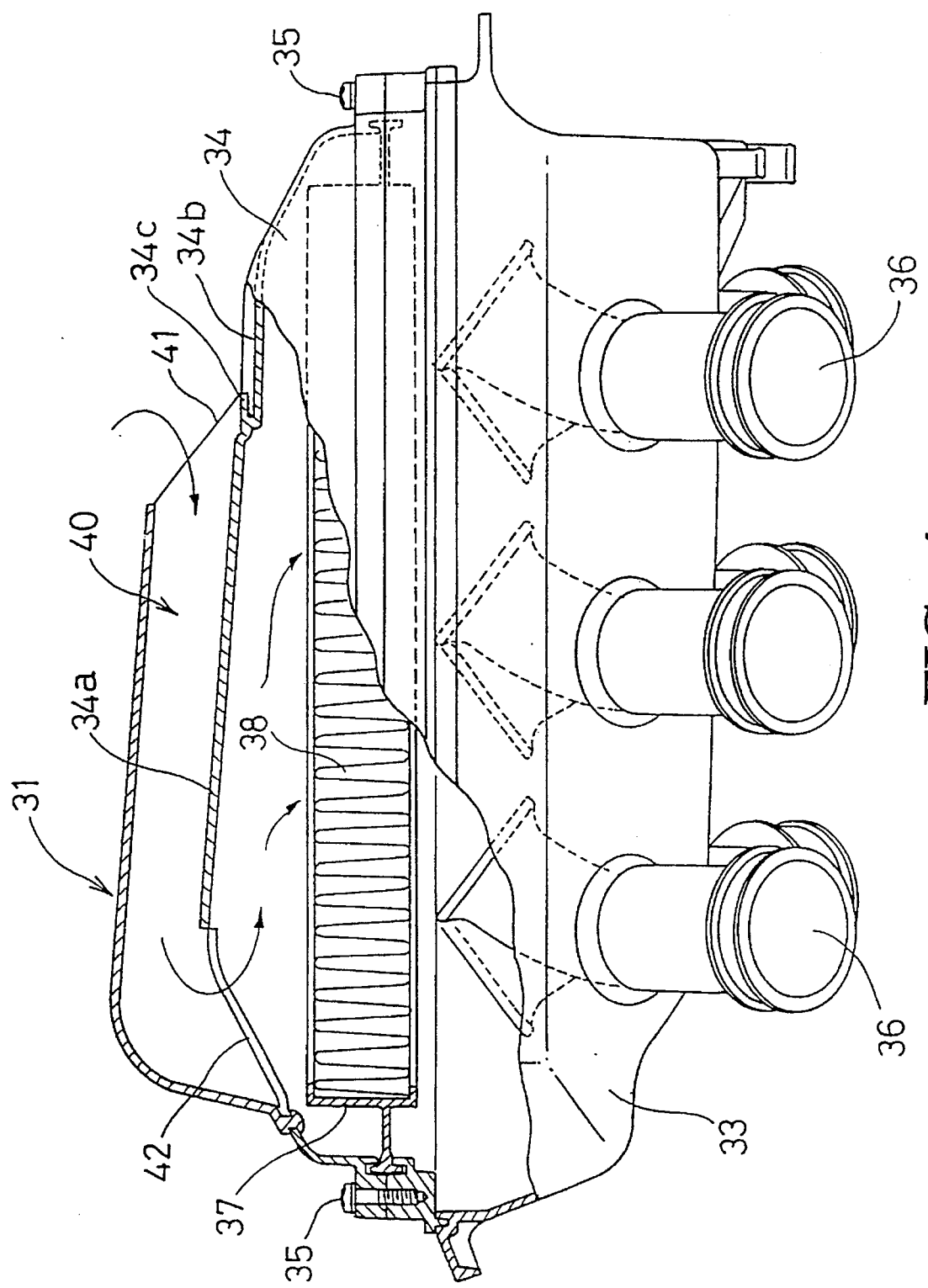
FIG. 4 is a side view of the air cleaner of the present invention with parts partially broken away.
Figure 5:
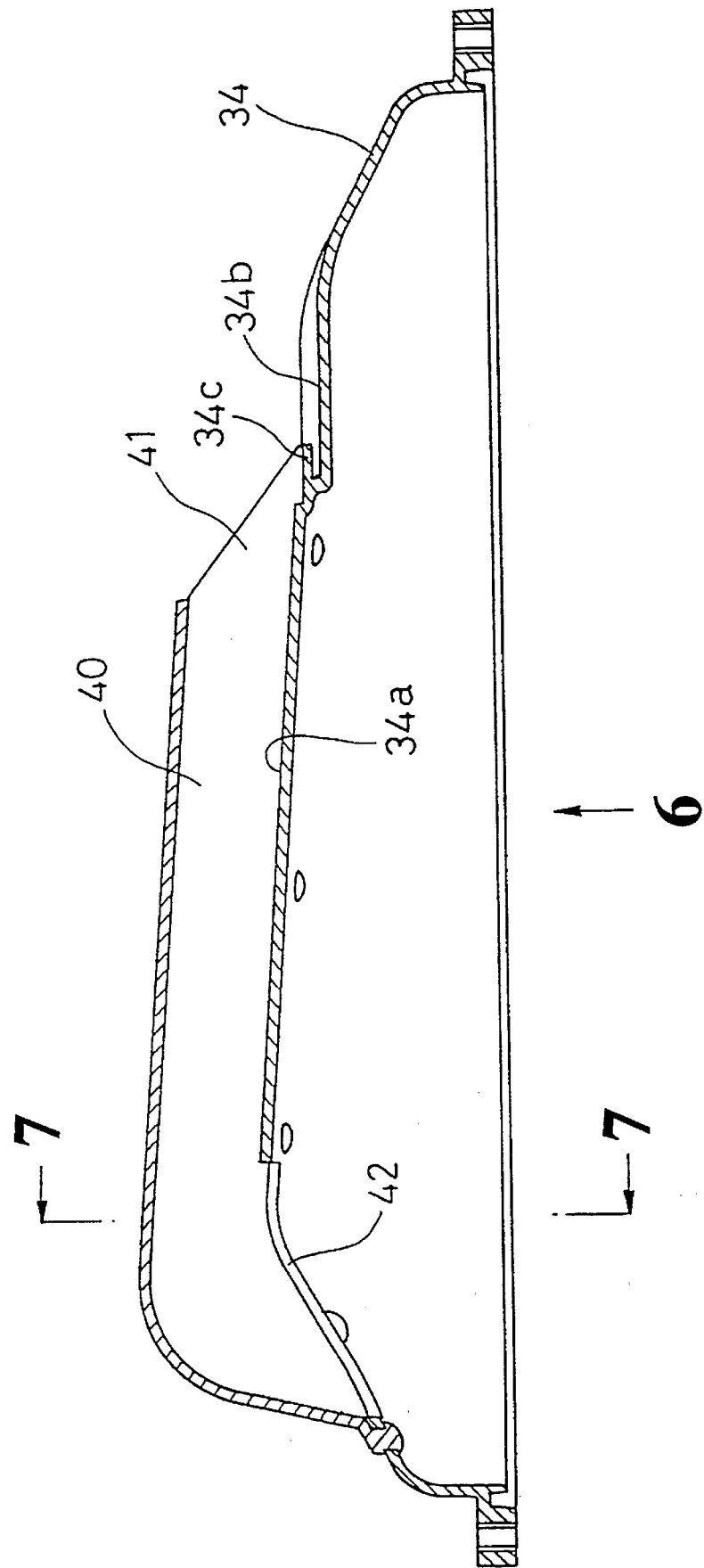
FIG. 5 is a sectional side view of an upper case of the air cleaner.
Figure 6:
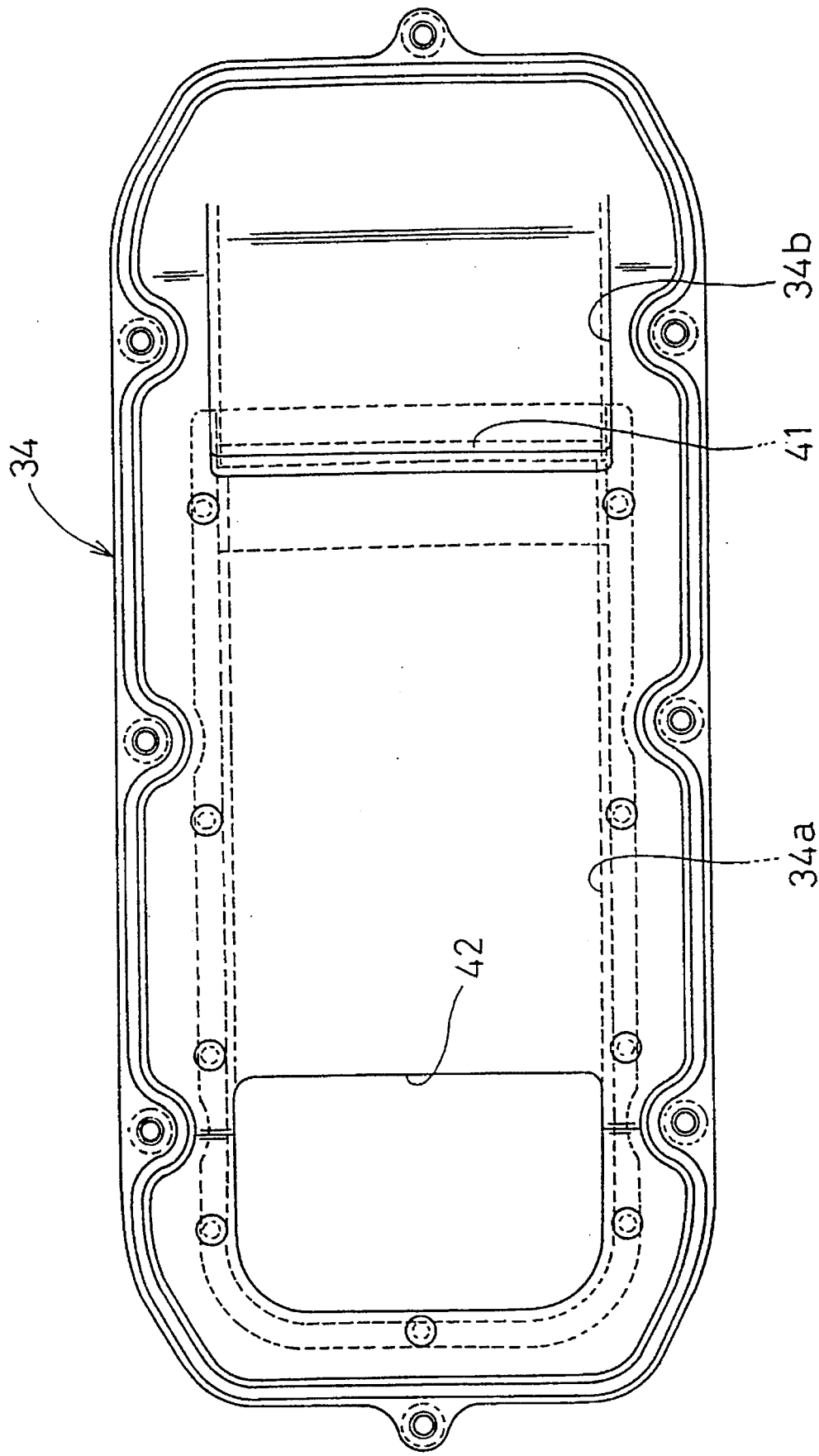
FIG. 6 is a view seen along the direction of 6 of FIG. 5.
Figure 7:
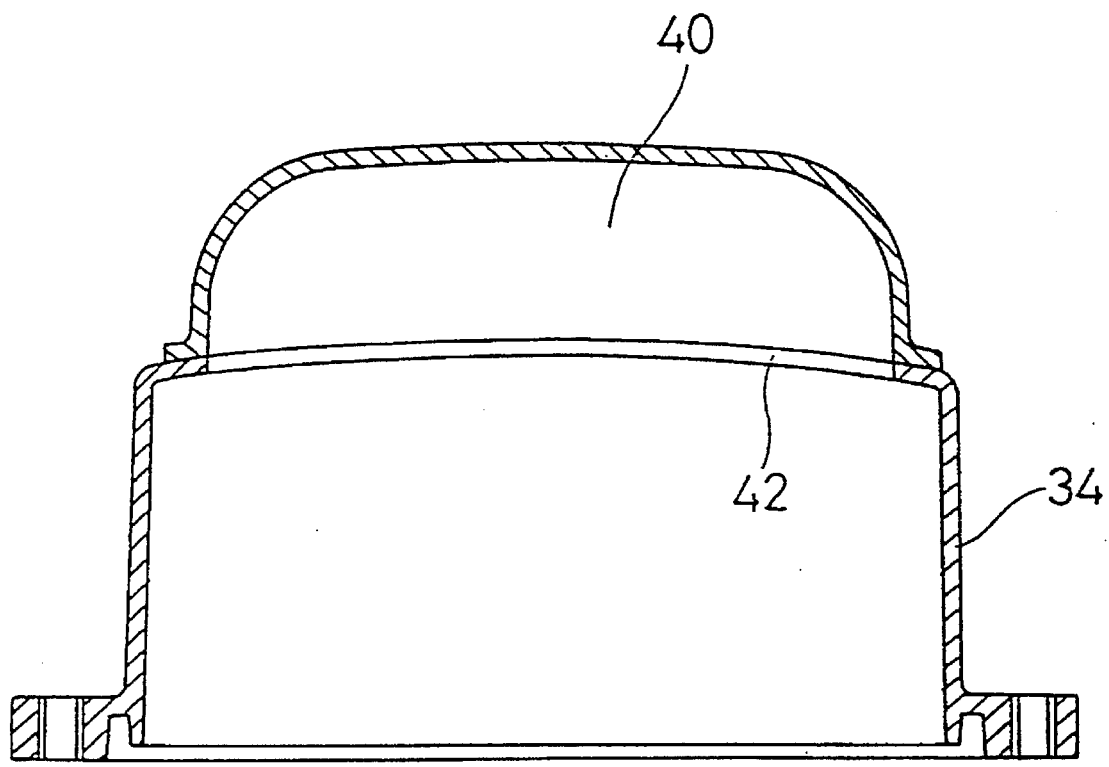
FIG. 7 is a sectional view taken along line 7—7 in FIG. 5.

An embodiment of the present invention will now be described with reference to the accompanying drawings. In the motorcycle shown in FIG. 1, main frames 2 extend obliquely, rearwardly and downwardly from a head pipe 1. Rear frames 3 and seat rails 4 extend obliquely, rearwardly and upwardly from the lower ends of the main frames 2. A rear fender 5 is mounted on the rear frames 3 and the seat rails 4. A seat 6 is supported on the rear fender 5.

A steering shaft rotatable by a handle 7 is inserted in the head pipe 1. In this steering shaft, an upper bridge 8 is mounted at the upper end, and a lower bridge 9 is mounted at the lower end. The upper half portions of a pair of right and left front fork portions 10 are held between the upper bridge 8 and the lower bridge 9. The shaft of a front wheel 11 is supported at the lower ends of the pair of right and left front fork portions 10.

The front end of a swing arm 14 is pivotably supported at the lower end of the main frame 2. A damper 15 is operatively connected between an intermediate portion of the swing arm 14 and the rear frame 3. The shaft of a rear wheel 16 is supported at the rear ends of the swing arms 14.

Sub-frames 17 extend forwardly from the lower ends of the main frames 2. A step 18, a gear shifting lever 19, a brake pedal 20, and a stand 21 are supported on the sub-frame 17 through brackets.

Down frames 22 extend downwardly from the head pipe 1. Laterally-extending engine guard pipes 23 are mounted between the lower end of the down frame 22 and the front end of the sub-frame 17. A horizontal six-cylinder engine 24 is mounted in a space surrounded by the main frames 2, the sub-frames 17, the down frames 22 and the engine guard pipes 23.

Exhaust pipes 25 extend from each cylinder of the engine 24, and a muffler 26 is connected to the downstream ends of these exhaust pipes 25. A cover 27 is provided outside the connecting portion between the muffler 26 and the exhaust pipes 25.

A fuel tank 30 is mounted in such a manner as to straddle the main frames 2. An air cleaner 31 is disposed under the fuel tank 30. A carburetor 32 corresponding to each cylinder of the engine 24 is disposed under the air cleaner 31. The structure of the air cleaner 31 will now be described with reference to FIGS. 4 to 7.

The air cleaner 31 includes an upper case 34 and a lower case 33, which are fixed to each other by small screws 35. Air intake pipes 36 for supplying air to the carburetors 32 extend from the lower case 33. A filter 38 is held between the lower case 33 and the upper case 34 by a holder 37.

An air intake duct 40 is formed on the upper case 34. The bottom wall or surface of the air intake duct 40 is formed by an upper wall or surface 34a of the upper case 34. An opening portion 41 of the air intake duct 40 is opened toward the rear side of the vehicle.

A recessed portion 34b is formed on the upper surface 34a of the upper case 34 in front of the opening portion 41 of the air intake duct relative to the air flow direction of the air intake duct. As a result, the bottom surface of the opening portion 41 is higher than the surface of the recessed portion 34b, thereby preventing the passage of water droplets into the air intake duct. A portion of the upper surface 34a at a lower end portion of the opening portion 41, is formed as an extension portion 34c extending over the recessed portion 34b, thus positively preventing the passage or flow of water droplets.

The bottom surface of the air intake duct 40 is formed to be gradually upwardly inclined viewed in the direction traveling from the opening portion 41 to an opening portion 42 formed in the upper surface 34a of the upper case 34. With this arrangement, even if a water droplet is located on the bottom surface of the air intake duct 40, it can be prevented from flowing into the opening portion 42 and into the case.

Since the recessed portion 34b, the extension portion 34c, and the bottom surface of the air intake duct are gradually upwardly inclined, it is possible to positively prevent water droplets from running along the bottom surface of the air intake duct 40 and entering the air cleaner case. Alternatively, the whole front portion of the opening portion 41 may be lowered without the formation of the recessed portion 34b.

As described above, several advantages are obtained with a vehicular air cleaner of the present invention. Because the upper surface of an air cleaner case is also the bottom surface of the air intake duct, it becomes possible to reduce the number of parts, to reduce the size of the air cleaner while ensuring a necessary capacity, and to reduce the number of assembling processes.

According to the present invention, with respect to the upper surface of the air cleaner case, a portion in front of the opening portion of the air intake duct relative to the air flow direction is formed lower than the bottom surface of the opening portion. As a result, it is possible to positively prevent the entry of water droplets into the opening portion.

Further, by orienting the opening portion of the air intake duct rearwardly of the vehicle and forming the bottom surface of the air intake duct to be gradually upwardly inclined in the direction from the opening portion to the front side of the vehicle, it is possible to further positively prevent the entry of water.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner for supplying air to an engine of a vehicle, said air cleaner comprising:

an air cleaner case having an upper wall including an upper surface;

an air intake duct attached to said upper wall of said air cleaner case, said air intake duct including an opening for passage of air therethrough, said upper surface of said air cleaner case forming a lower surface of said air intake duct;

said upper wall having a recess therein located adjacent to said opening and exterior of the air intake duct, said recess having a floor portion located at an elevation lower than a bottom portion of said opening.

2. The air cleaner according to claim 1, wherein said lower surface of said air intake duct adjacent said opening includes an extension portion extending over and spaced above said recess.

3. The air cleaner according to claim 2, wherein said lower surface of said air intake duct is upwardly inclined viewed in a direction of airflow travelling through said opening and into said air cleaner.

4. The air cleaner according to claim 3, wherein said opening of said air intake duct is open toward a rear of said vehicle.

5. The air cleaner according to claim 4, wherein said vehicle is a motorcycle including a fuel tank, and wherein said air cleaner is positioned directly under said fuel tank.

6. The air cleaner according to claim 2, wherein said vehicle is a motorcycle including a fuel tank, and wherein said air cleaner is positioned directly under said fuel tank.

7. The air cleaner according to claim 3, wherein said vehicle is a motorcycle including a fuel tank, and wherein said air cleaner is positioned directly under said fuel tank.

8. The air cleaner according to claim 1, wherein said lower surface of said air intake duct is upwardly inclined viewed in a direction of airflow travelling through said opening and into said air cleaner.

9. The air cleaner according to claim 8, wherein said opening of said air intake duct is open toward a rear of said vehicle.

10. The air cleaner according to claim 9, wherein said vehicle is a motorcycle including a fuel tank, and wherein said air cleaner is positioned directly under said fuel tank.

11. The air cleaner according to claim 8, wherein said vehicle is a motorcycle including a fuel tank, and wherein said air cleaner is positioned directly under said fuel tank.

12. The air cleaner according to claim 1, wherein said opening of said air intake duct is open toward a rear of said vehicle.

13. The air cleaner according to claim 12, wherein said vehicle is a motorcycle including a fuel tank, and wherein said air cleaner is positioned directly under said fuel tank.

14. The air cleaner according to claim 1, wherein said vehicle is a motorcycle including a fuel tank, and wherein said air cleaner is positioned directly under said fuel tank.

15. An air cleaner for supplying air to an engine of a vehicle, said air cleaner comprising:

an air cleaner case having an upper wall including an upper surface;

an air intake duct attached to said upper wall of said air cleaner case, said air intake duct including an opening open toward a rear of said vehicle for passage of air therethrough, said upper surface of said air cleaner case forming a lower surface of said air intake duct;

wherein said lower surface of said air intake duct is upwardly inclined viewed in a direction of airflow travelling through said opening and into said air cleaner.

16. The air cleaner according to claim 15, wherein said vehicle is a motorcycle including a fuel tank, and wherein said air cleaner is positioned directly under said fuel tank.

* * * * *